(12) United States Patent
Stalzer (10) Patent No.: US 10,185,655 B2
(45) Date of Patent: Jan. 22, 2019

(54) SYSTEMS AND METHODS FOR RAPID PROCESSING AND STORAGE OF DATA

(71) Applicant: California Institute of Technology, Pasadena, CA (US)

(72) Inventor: Mark A. Stalzer, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 15/389,049

(22) Filed: Dec. 22, 2016

(65) Prior Publication Data

US 2017/0103016 A1    Apr. 13, 2017

Related U.S. Application Data

(63) Continuation of application No. 13/158,161, filed on Jun. 10, 2011, now Pat. No. 9,552,299.

(Continued)

(51) Int. Cl.
*G06F 12/00* (2006.01)
*G06F 13/00* (2006.01)
(Continued)

(52) U.S. Cl.
CPC ...... *G06F 12/0246* (2013.01); *G06F 12/0866* (2013.01); *G06F 2212/214* (2013.01);
(Continued)

(58) Field of Classification Search
CPC ........... G06F 12/0866; G06F 2212/214; G06F 12/0246; G06F 2212/224; G06F 2212/7201; H04L 49/25
(Continued)

(56) References Cited

U.S. PATENT DOCUMENTS 5,623,644 A * 4/1997 Self .................. G06F 15/17381
709/234
5,634,043 A * 5/1997 Self .................. G06F 15/17381
713/503

(Continued)

FOREIGN PATENT DOCUMENTS

| WO | 199319419 A1 | 9/1993 |
| WO | 2011156746 A2 | 12/2011 |
| WO | 2011156746 A3 | 12/2011 |

OTHER PUBLICATIONS

International Preliminary Report on Patentability for International Application No. PCT/US2011/040029, dated Dec. 14, 2012, 5 pgs.

(Continued)

*Primary Examiner* — Sheng Jen Tsai
(74) *Attorney, Agent, or Firm* — KPPB LLP (57) ABSTRACT

Systems and methods of building massively parallel computing systems using low power computing complexes in accordance with embodiments of the invention are disclosed. A massively parallel computing system in accordance with one embodiment of the invention includes at least one Solid State Blade configured to communicate via a high performance network fabric. In addition, each Solid State Blade includes a processor configured to communicate with a plurality of low power computing complexes interconnected by a router, and each low power computing complex includes at least one general processing core, an accelerator, an I/O interface, and cache memory and is configured to communicate with non-volatile solid state memory.

20 Claims, 2 Drawing Sheets

Related U.S. Application Data (60) Provisional application No. 61/354,121, filed on Jun. 11, 2010, provisional application No. 61/431,931, filed on Jan. 12, 2011.

(51) Int. Cl.
*G06F 12/02* (2006.01)
*G06F 12/0866* (2016.01)
*H04L 12/947* (2013.01)

(52) U.S. Cl.
CPC ............... *G06F 2212/224* (2013.01); *G06F 2212/7201* (2013.01); *H04L 49/25* (2013.01)

(58) Field of Classification Search
USPC ........................................................ 711/118
See application file for complete search history.

(56) References Cited

U.S. PATENT DOCUMENTS

| | | | | |
|---|---|---|---|---|
| 5,720,031 | A * | 2/1998 | Lindsay | G11C 29/44 714/42 |
| 5,963,746 | A * | 10/1999 | Barker | G06F 15/8007 709/238 |
| 6,044,405 | A | 3/2000 | Driscoll et al. | |
| 7,895,365 | B2 * | 2/2011 | Rofougaran | G06F 1/1632 710/14 |
| 8,037,391 | B1 * | 10/2011 | Jung | G06F 11/1076 714/758 |
| 8,296,515 | B1 * | 10/2012 | Saxena | G06F 11/1076 711/114 |
| 8,533,851 | B2 * | 9/2013 | Ginter | G06F 21/10 713/193 |
| 8,762,609 | B1 * | 6/2014 | Lam | G06F 15/8007 710/22 |
| 9,552,299 | B2 | 1/2017 | Stalzer | |
| 2002/0042870 | A1 | 4/2002 | Rocray et al. | |
| 2003/0191863 | A1 * | 10/2003 | Greenblat | G06F 15/78 709/251 |
| 2004/0010612 | A1 * | 1/2004 | Pandya | H04L 29/06 709/230 |
| 2004/0103218 | A1 * | 5/2004 | Blumrich | G06F 9/52 709/249 |
| 2004/0148472 | A1 | 7/2004 | Barroso et al. | |
| 2005/0015531 | A1 | 1/2005 | Yabuta et al. | |
| 2005/0028069 | A1 * | 2/2005 | Thayer | G06F 11/1076 714/770 |
| 2005/0071554 | A1 * | 3/2005 | Thayer | G06F 11/1076 711/114 |
| 2005/0108518 | A1 * | 5/2005 | Pandya | H04L 63/0485 713/151 |
| 2006/0136570 | A1 * | 6/2006 | Pandya | G06F 17/30985 709/217 |
| 2007/0050546 | A1 * | 3/2007 | Fujii | G06F 3/0617 711/114 |
| 2007/0058410 | A1 * | 3/2007 | Rajan | G11C 5/02 365/63 |
| 2008/0065808 | A1 | 3/2008 | Hoese et al. | |
| 2008/0140661 | A1 * | 6/2008 | Pandya | G06F 9/444 |
| 2008/0306995 | A1 * | 12/2008 | Newell | G06F 17/30265 |
| 2009/0086359 | A1 * | 4/2009 | Mead | G06F 3/0611 360/71 |
| 2009/0198854 | A1 | 8/2009 | Rofougaran et al. | |
| 2009/0216910 | A1 * | 8/2009 | Duchesneau | G06F 9/5072 709/250 |
| 2009/0259713 | A1 | 10/2009 | Blumrich et al. | |
| 2010/0017649 | A1 * | 1/2010 | Wu | G06F 11/108 714/6.11 |
| 2011/0022812 | A1 * | 1/2011 | van der Linden | G06F 9/5077 711/163 |
| 2011/0185119 | A1 * | 7/2011 | Madpuwar | G06F 11/108 711/114 |
| 2011/0197017 | A1 * | 8/2011 | Yu | G06F 12/0246 711/103 |
| 2011/0209221 | A1 * | 8/2011 | Hanson | G06F 17/30265 726/26 |
| 2011/0219208 | A1 * | 9/2011 | Asaad | G06F 15/76 712/12 |
| 2011/0285729 | A1 * | 11/2011 | Munshi | G06F 9/5044 345/536 |
| 2011/0307647 | A1 | 12/2011 | Stalzer | |
| 2012/0278074 | A1 * | 11/2012 | Burke | G06F 3/0346 704/235 |
| 2013/0097448 | A1 * | 4/2013 | Davis | H04L 45/60 713/323 |
| 2014/0192583 | A1 * | 7/2014 | Rajan | G11C 7/10 365/63 |

OTHER PUBLICATIONS

International Search Report and Written Opinion for International Application No. PCT/US2011/040029, completed Feb. 7, 2012, dated Feb. 9, 2012, 8 pgs.
"IBM Roadrunner", In Wikipedia, Retrieved on May 28, 2013 from http://en.wikipedia.org/wiki/IBM_Roadrunner, 6 pages.
"TOP500 Supercomputing Sites", TOP500 Supercomputing Sites, Retrieved on Nov. 2010 from http://www.top500.org, 7 pages.
"TOP500 Supercomputing Sites", TOP500 Supercomputing Sites, Retrieved on Nov. 2011 from http://www.top500.org, 13 pages.
"Virtex-7 FPGAS", Xilinx, Inc., Retrieved on May 28, 2013 from http://www.xilinx.com/publications/prod_mktg/Virtex7-Product-Table.pdf, 1 pg.
Chang et al., "A Commitment-Based Management Strategy for the Performance and Reliability Enhancement of Flash-Memory Storage Systems", DAC '09, Jul. 26-31, 2009, pp. 858-863.
Clearspeed, "CSX700 Processor", ClearSpeed, Retrieved May 28, 2013 from www.clearspeed.com/products/csx700.php, 2 pages.
He et al., "DASH: A Recipe for a Flash-Based Data Intensive Supercomputer", Proc. 2010 Conf. High Performance Computing, Networking, Storage and Analysis, New Orleans, LA, 2010, pp. 1-11.
He et al., "DASH-IO: an Empirical Study of Flash-based IO for HPC", Proc. 2010 Conf. High Performance Computing, Networking, Storage and Analysis, New Orleans, LA, 2010, 8 pgs.
Intel, "An introduction to the Intel QuickPath Interconnect", Intel, Doc. #320412-001US, Jan. 2009, pp. 1-22.
Intel, "Teraflops Research Chip: Project", Retrieved on May 28, 2013 from http://www.intel.com/content/www/us/en/research/intel-labs-teraflops-research-chip.html, 2 pages.
Kim et al., "FlashSim: A Simulator for NAND Flash-Based Solid-State Drives", Tech Report CSE 09-008, Penn State University, May 4, 2009, 18 pages.
Lee, "Finite State Machines and Modal Models in Ptolemy II", Technical Report No. UCB/EECS-2009-151, UC Berkeley, Nov. 1, 2009, pp. 1-42.
Neumann et al., "RDF-3X: a RISC-style Engine for RDF", PVLDB '08, Auckland, New Zealand, Aug. 23-28, 2008, pp. 647-659.
RDF, "W3C Semantic Web", W3C: Resource Description Framework (RDF), Feb. 10, 2004, Last modified Mar. 22, 2013, Accessed May 28, 2013 from http://www.w3.org/RDF/, 3 pages.
Rosenblum et al., "The Design and Implementation of a Log-Structured File System", ACM Trans. on Computer Syst., vol. 10, No. 1, Feb. 1992, pp. 26-52.
Saldana et al., "MPI as an Abstraction for Software-Hardware Interaction for HPRCs", In High-Performance Reconfigurable Computing Technology and Applications, 2008, 10 pages.
Stalzer, "FlashBlades: System Architecture and Applications", ASBD '12, Portland, Oregon, Jun. 9, 2012, pp. 1-5.
Stone et al., "OpenCL: A Parallel Programming Standard for Heterogeneous Computing Systems", IEEE CS and the AIP, Computing in Science and Engineering, vol. 12, 2010, pp. 66-72.
Szalay et al., "Low-Power Amdahl-Balanced Blades for Data Intensive Computing", SIGOPS Oper. Syst. Rev., vol. 44, No. 1, 2010, pp. 71-75.

(56) References Cited

OTHER PUBLICATIONS

Tsubame Computing Services, "TSUBAME2 System Architecture", Global Scientific Information and Computing Center, Tokyo Institute of Technology, Retrieved on May 28, 2013 from http://tsubame.gsic.titech.ac.jp/en/tsubame2-system-architecture, last updated Jul. 13, 2011, 2 pgs.

* cited by examiner

SYSTEMS AND METHODS FOR RAPID PROCESSING AND STORAGE OF DATA

CROSS-REFERENCES TO RELATED APPLICATIONS

The present invention claims priority to U.S. Provisional Application No. 61/354,121 entitled "System for the Rapid Processing and Storage Data" to Mark Stalzer, filed Jun. 11, 2010, U.S. Provisional Application No. 61/431,931 entitled "A System for the Rapid Processing and Storage Data" to Mark Stalzer, filed Jan. 12, 2011, and U.S. patent application Ser. No. 13/158,161 entitled "System and Methods for Rapid Processing and Storage of Data" to Mark Stalzer, filed Jun. 10, 2011, the disclosures of which are incorporated by reference herein in its entirety.

STATEMENT OF FEDERALLY SPONSORED RESEARCH

This invention was made with government support under Grant No. DE-FC52-08NA28613 awarded by the Department of Energy. The government has certain rights in the invention.

FIELD OF THE INVENTION

The present invention generally relates to parallel processing systems and more specifically relates to parallel processing systems for rapidly accessing and processing data.

BACKGROUND

The term supercomputer is used to describe a computer that is at the frontline of current processing capacity. Most contemporary supercomputers are massive parallel processing systems that are typically implemented as highly-tuned computer clusters using commodity parts with perhaps one or two special parts, such as a Field Programmable Gate Array (FPGA) or Application Specific Integrated Circuit (ASIC), that can be easily manufactured using commodity processes. Each computer cluster is a group of linked computers that work cooperatively. The ability to process extreme workloads comes from system architecture and packaging, with power consumption being an important system constraint. Many modern supercomputing systems are constructed from a plurality of "blades" that are interconnected by a high-performance switch fabric such as InfiniBand (IB), which is specified by the InfiniBand Trade Association. Each blade is typically composed of a general-purpose processor, memory, and an accelerator for highly structured calculations, such as matrix multiplication.

The current state of the art in power-efficient petascale processing of simulation workloads is TSUBAME2 at the Tokyo Institute of Technology, which runs the LINPACK benchmark at 852 Tflops per megawatt. TSUBAME2 includes 1442 computing nodes connected using an InfiniBand network fabric. There are three node types, which differ in the amount of memory capacity. There are 1408 so called "thin nodes" that each include a 6 core Intel Xeon processor running at 2.93 GHz and three NVIDIA Tesla M2050 GPU accelerators, each of which includes 448 small power-efficient processing cores with 3 GB of high-bandwidth GDDR5 memory. Each "thin node" also includes local storage in the form of a 120 GB solid-state drive (SSD), that is mostly used by the operating system. The 24 "medium nodes" and the 10 "fat nodes" include 8 core Intel Xeon processors running at 2.0 GHz and a NVIDIA Tesla S1070 with additional memory and larger local storage. Most of TSUBAME2's 2.4 PFlops of performance comes from the GPUs on its thin clients. The GPU memory, while limited in its capacity compared to CPU memory, features 150 GB/s bandwidth, and the GPUs are connected via 8 GB/s PCI Express lanes. All compute nodes are interconnected by InfiniBand networks, providing each node with 10 GB/s inter-node bandwidth. Overall TSUBAME2 includes 173.88 TB of SSD storage and each computing node can access in excess of 7 PB of disk based storage capacity via the InfiniBand switch fabric. TUSBAME2 is highly effective at numerical calculations, but a significant bottleneck exists between the disk storage and blades due to the physical characteristics of spinning disk drives and the access through the InfiniBand switch fabric.

Another leading supercomputer is Roadrunner at the Los Alamos National Laboratory, which was built by International Business Machines of Armonk, N.Y. Roadrunner includes 12,960 IBM PowerXCell 8i and 6,480 AMD Opteron dual-core processors in specially designed blade servers connected by an InfiniBand switch fabric. The InfiniBand switch fabric is also used to communicate between the blades and an array of spinning disk drives for the storage of data. As is the case with the higher performing TSUBAME2, Roadrunner is impacted by a bottleneck that exists between its disk storage and blades.

Modern personal electronic devices such as mobile phones or the iPad manufactured by Apple Computer of Cupertino, Calif. have highly integrated, low power, electronics. Specifically, these devices use three concepts and technologies: System on Chip (SoC), Package on Package (PoP), and non-volatile NAND flash memories. A SoC integrates multiple functions onto one chip such as general purpose processing, accelerated processing, storage control, and communications links. PoP is a way to stack chips in a 3D structure that allows for denser packing and it is typically used for memories on top of processors. Examples of PoPs including SoCs include the Apple A4 and A5 that drive the iPad and iPad 2 respectively. The Apple A4 is a PoP SoC that combines a 1 GHz ARM Cortex-A8 CPU with a PowerVR SGX 535 GPU, and emphasizes power efficiency. The Apple A4 can stack 256 MB or 512 MB of random access memory (RAM) on its processor. The details of the recently announced Apple A5 are less well known. Intel also makes similar parts. Flash memories are non-volatile (data persists when powered off) and have excellent performance compared to disk drives. Flash memories are used in a variety of devices including cell phones, digital cameras, and very portable computers. The Apple A4 and A5 both include memory controllers configured to read and write data to Flash memory.

SUMMARY OF THE INVENTION

Systems and methods in accordance with embodiments of the invention overcome bottlenecks experienced by supercomputers that access data from disk arrays and can provide 75× faster bandwidth to storage and 100× better latency (time to randomly access storage) by closely connecting processing to storage.

One embodiment of the invention includes a processor configured to communicate with a plurality of low power computing complexes interconnected by an on-blade router. In addition, each low power computing complex includes at least one general processing core, an accelerator, an I/O interface, and cache memory and is configured to communicate with non-volatile solid state memory, and the blade server is configured to communicate via a high performance network fabric.

In a further embodiment, each low power computing complex is a System on Chip with Package on Package DRAM memory.

In another embodiment, the solid state memory is NAND Flash memory.

In a still further embodiment, the solid state memory is configured in a RAID configuration and the low power computing complex further includes a RAID controller.

In still another embodiment, the low power computing complex is configured to communicate with the non-volatile memory at a rate of at least 200 MB/s.

In a yet further embodiment, the at least one general processing core is a low power RISC processor.

In yet another embodiment, the I/O interface is configured to communicate at a rate of at least 500 MB/s.

A further embodiment again includes at least 32 low power computing complexes.

In another embodiment again the router is configured to connect the low power computing complexes using individual interconnects.

In a further additional embodiment, each interconnect is configured to provide data rates of at least 500 MB/s.

In another additional embodiment, the router includes an interconnect to the processor.

In a still yet further embodiment, the interconnect between the router and the processor is configured to provide data rates of at least 25 GB/s.

In still yet another embodiment, the router also includes at least one port to the high performance network fabric.

A still further embodiment again includes at least one Solid State Blade configured to communicate via a high performance network fabric. In addition, each Solid State Blade includes a processor configured to communicate with a plurality of low power computing complexes interconnected by a router, and each low power computing complex includes at least one general processing core, an accelerator, an I/O interface, and cache memory and is configured to communicate with non-volatile solid state memory.

In still another embodiment again, each low power computing complex is a System on Chip with Package on Package DRAM memory.

In a still further additional embodiment, the solid state memory is configured in a RAID configuration and each low power computing complex includes a RAID controller.

In still another additional embodiment, the router is configured to connect the low power computing complexes using individual interconnects, and the router includes an interconnect to the processor.

In a still yet further embodiment again, pluralities of the low power computing complexes are directly connected.

In still yet another embodiment again, the router also includes at least one port to the high performance network fabric.

A still yet further additional embodiment also includes a plurality of Solid State Blades interconnected via a high performance network fabric.

Another further embodiment includes a plurality of blade servers interconnected via a high performance network, where at least one of the blade servers is a Solid State Blade. In addition, each Solid State Blade includes a processor configured to communicate with a plurality of low power computing complexes interconnected by a router, and each low power computing complex includes at least one general processing core, an accelerator, an I/O interface, and cache memory and is configured to communicate with non-volatile solid state memory.

DETAILED DESCRIPTION

Turning now to the drawings, systems and methods of building massively parallel computing systems using low power computing complexes in accordance with embodiments of the invention are illustrated. In many embodiments, the low power computing complexes include a System on Chip (SoC) that combines low power general processing core(s) with an accelerator, and an I/O interface, with Package on Package (PoP) DRAM. In several embodiments, the SoC also includes a RAID memory controller that can coordinate the reading and writing of data to one or more non-volatile memory chips such as (but not limited to) NAND Flash memory chips. The low power computing complexes are small and efficient, and can achieve at least 64 Gflops and access data at rates of at least 200 MB/s from the non-volatile memories.

In many embodiments, an array of low power computing complexes are used to construct computing blades, referred to as Solid State Blades. The array of low power computing complexes and associated non-volatile memory on each Solid State Blade behaves like a very fast disk and a very fast accelerator. In a number of embodiments, Solid State Blades can be constructed that achieve performances of 4 Tflops in the accelerators of the low power computing complexes and possessing a storage capacity of 6.1 TB of non-volatile memory. The latency of Flash memory is approximately 50 µs compared to a latency of approximately 5 ms for a traditional disk. Accordingly, a Solid State Blade in accordance with embodiments of the invention can achieve 100 times I/O performance in both latency and bandwidth with balanced computing compared to a server blade that accesses data on disc storage.

The Solid State Blades can work with each other via a high performance networking fabric. Servers can be built using multiple Solid State Blades and multiple servers can be connected to create massively parallel computing systems. A single server including 14 Solid State Blades can achieve 56 Tflops with 85 TB of useable non-volatile memory. As the performance of the accelerators used in the low power computing complexes increases in accordance with Moore's law for the next three generations of processors, massively parallel computing systems will be able to be constructed using Solid State Blades in accordance with embodiments of the invention that can achieve 300+ Pflops at 10 MW while manipulating hundreds of Petabytes of data. Overall the Solid State Blades' extremely low storage latency, bandwidth, and close coupling to processing resources can provide significant advantages in a variety of applications. Low power computing complexes, Solid State Blades, and massively parallel computing systems in accordance with embodiments are discussed further below.

Low Power Computing Complexes

Massively parallel computing systems in accordance with embodiments of the invention are built using low power computing complexes that include a SoC, which combines low power general processing core(s) with an accelerator, and Package on Package (PoP) DRAM. In many embodiments, the SoC is fabricated as an ASIC based upon existing intellectual property (IP) blocks.

Figure 1:
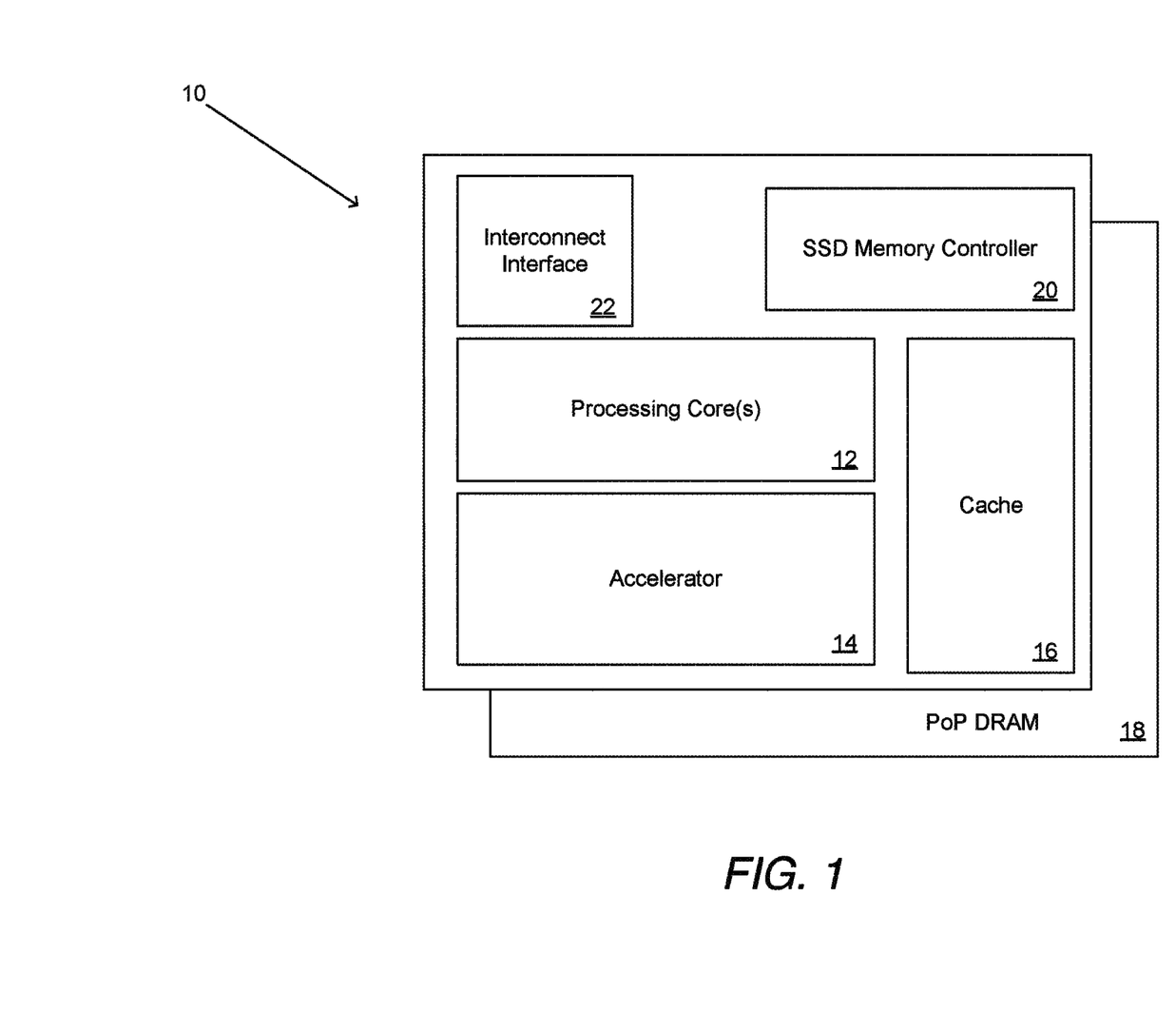
FIG. 1 illustrates a semi-schematic diagram of a low power computing complex in accordance with an embodiment of the invention.

A low power computing complex in accordance with an embodiment of the invention is illustrated in FIG. 1. The low power computing complex 10 includes at least one low power general processing core 12. The low power general processing core(s) can be selected from any number of suitable processing cores including but not limited to any of the ARM cores developed by ARM Holdings, Plc. of Cambridge, United Kingdom or any of the Atom cores developed by Intel Corporation of Santa Clara, Calif. The low power computing complex 10 also includes an accelerator 14. Any of a number of different accelerators can be utilized including but not limited to the CSX700 processor distributed by ClearSpeed Technology Ltd. of Bristol, United Kingdom or similar GPU IP blocks. The low power general processing core 12 and the accelerator 14 have an associated cache memory 16. As noted above, the low power computing complex 10 also includes a PoP DRAM 18. In several embodiments, at least 1 GB of DRAM is provided. In other embodiments, the amount of DRAM provided is determined by the capabilities of the general processing unit core and the requirements of the specific application.

The low power computing complex 10 can directly read and write data to a non-volatile memory component (e.g. a NAND Flash memory) configured as a RAID array. In a number of embodiments, the RAID array is implemented using a RAID controller incorporated into each low power computing complex. In several embodiments, four 32 GB non-volatile memories are arranged in a RAID configuration to provide 96 GB of storage with access speeds of 200 MB/s. In other embodiments, any of a variety of non-volatile memory configurations can be utilized and/or an alternative non-volatile memory technology can be utilized in conjunction with an appropriate memory controller implementation.

In the illustrated embodiment, I/O between the low power computing complex 10 and other devices is managed by an interconnect interface 22. In several embodiments, the interconnect interface is configured to communicate using an 8-bit parallel interface running at 500 Mb/s. However, any of a variety of interconnect interfaces appropriate to a specific application can be utilized in accordance with embodiments of the invention.

In much of the discussion of performance that follows, the assumption is made that the low power computing complex is implemented using an Atom core and a CSX700 processor with at least 1 GB DRAM. The Atom core is assumed to access at least 96 GB of RAID non-volatile memory at rates of at least 200 MB/s and that an interconnect with a rate of at least 500 MB/s is used for I/O between the low power computing complex and external devices. A low power computing complex implemented in accordance with these characteristics is referred to as a C1 complex below. As can readily be appreciated, the state of the art in processor technology advances rapidly and newer or alternative general processing cores or accelerators can also be used and may provide superior performance. Interconnect technology also advances, and newer or alternative interconnects can also be utilized to provide superior performance. Furthermore, additional memory can be provided as supported by the processor cores and necessitated by the requirements of a specific application. Accordingly, the discussions of performance provided below with respect to the C1 complex should be viewed as illustrative and in no way limiting of the potential performance that could be obtained by a massively parallel computer implemented using low power computing complexes in accordance with embodiments of the invention.

Solid State Blades

Arrays of low power computing complexes in accordance with embodiments of the invention can be provided on blades that can be interconnected using a high performance switch fabric such as InfiniBand. Blades including arrays of low power computing complexes can be referred to as Solid State Blades and can be readily manufactured to fit within a commercial blade chassis to provide power and cooling, such as but not limited to an IBM Blade Center E. As is discussed further below, the storage of data within non-volatile memory in the array of low power computing complexes can provide a Solid State Blade with several orders of magnitude improvement in I/O performance relative to conventional blades that access data on disc storage.

Figure 2:
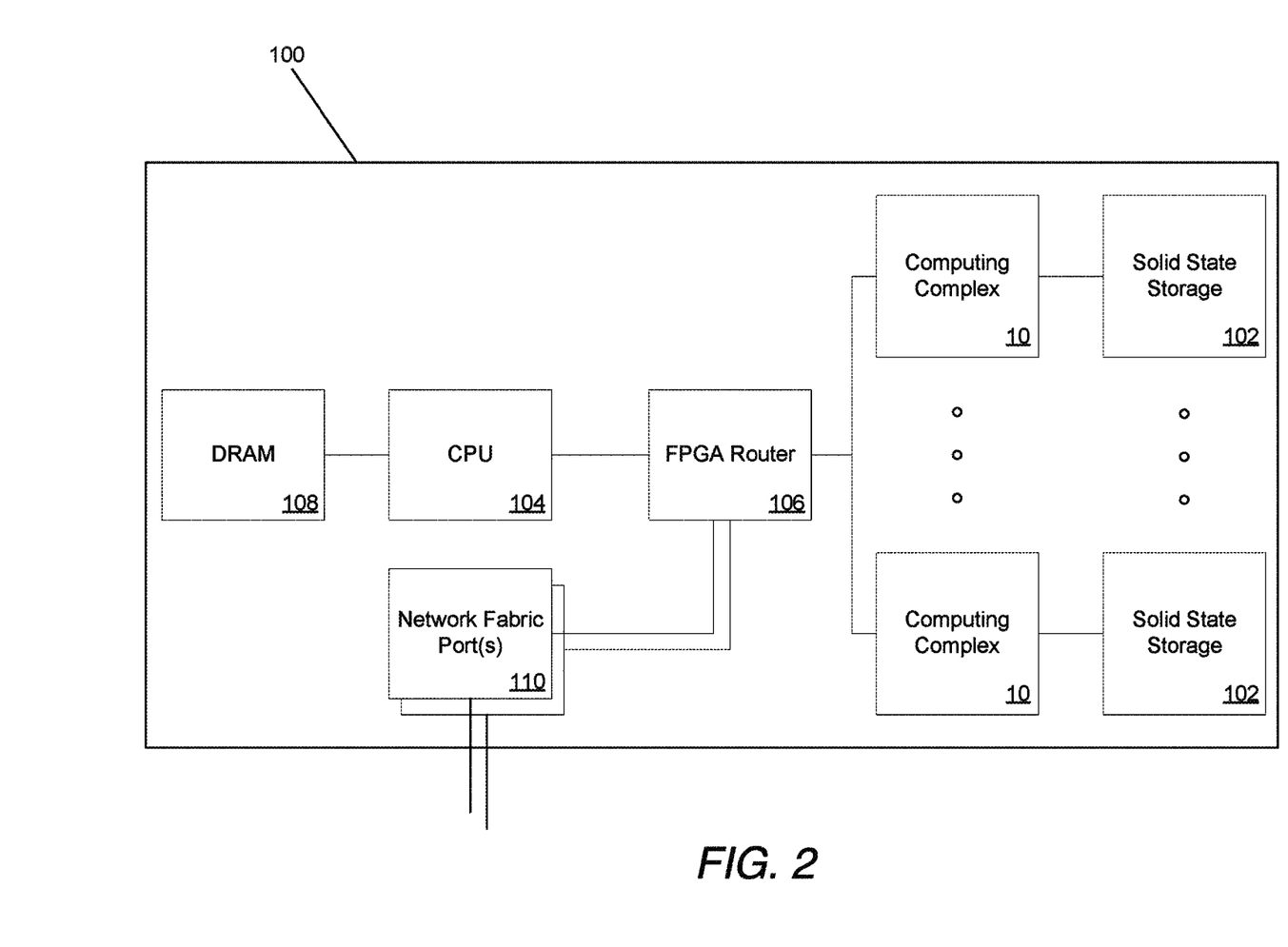
FIG. 2 illustrates a semi-schematic diagram of a Solid State Blade in accordance with an embodiment of the invention.

A Solid State Blade in accordance with an embodiment of the invention is illustrated in FIG. 2. The Solid State Blade 100 includes an array of low power computing complexes 10, each connected to non-volatile memory 102. For the purpose of estimating the performance of the Solid State Blade, the low power computing complexes can be assumed to be C1 complexes connected to 96 GB of usable non-volatile memory (e.g. NAND Flash memory). In other embodiments, any of the low power computing complexes and non-volatile memory options discussed above can be utilized as appropriate to a specific application. The number of low power computing complexes and the amount of non-volatile memory that can be included in an array on a Solid State Blade is typically only limited by the space requirements of the Solid State Blade and the power budget of the Solid State Blade. In a number of embodiments, an array of 64 low power computing complexes and associated non-volatile memory is included on each Solid State Blade. However, an array including any number of low power computing complexes and associated non-volatile memory appropriate to a specific application could also be utilized.

Each of the low power computing complexes 10 in the array is connected to a conventional multi-core CPU 104 by an FPGA router 106. In a number of embodiments, the FPGA router 106 connects to each of the low power computing complexes 10 using individual interconnects. In several embodiments, the interconnect is at least as high bandwidth as a 500 MB/s x1 PCI Express interconnect. In other embodiments, any interconnect appropriate to the requirements of a specific application can be utilized. The FPGA router 106 also provides an interconnect to the CPU 104 so that the CPU can access the low power computing complexes 10. In many embodiments, a 25 GB/s Quick Path Interconnect (QPI) can be utilized to interconnect the FPGA router 106 and the CPU 104. When the array includes 64 low power computing complexes communicating via 500 MB/s x1 PCI Express interconnects, the total bandwidth to the complexes is 32 GB/s. Therefore, the 25 GB/s QPI interconnect provides suitable bandwidth balance. In other embodiments, any appropriate interconnect can be utilized to connect the FPGA router 106 to the CPU. Although the above discussion refers to an FPGA, a router can be implemented using any of a variety of integrated circuit technologies in accordance with embodiments of the invention. Although the low power computing complexes are described above as connected via a router, in many embodiments the low power computing complexes are directly connected to form configurations including but not limited to mesh, or torus configurations. Accordingly, the manner in which the low power computing complexes are connected is largely a function of the requirements of a specific application.

A variety of CPUs 104 and associated memory 108 can be utilized in a Solid State Blade in accordance with an embodiment of the invention. In many embodiments, an Intel Westmere EP processor including six cores running at 2 GHz manufactured by Intel Corporation can be utilized in conjunction with 64 GB of DRAM. The CPU can run a commercial version of Linux and the low power computing complexes can run a commercial light weight real-time operating system such as VxWorks by Wind River Systems, Inc. of Alameda, Calif. Although any other suitable CPU, memory configuration, and operating systems can be utilized in accordance with embodiments of the invention. To the CPU, the array of low power computing complexes appears like a very fast disk and a very fast accelerator. The array of low power computing complexes can be programmed using existing standards, including but not limited to OpenCL, a common file system, and/or triple stores. As is discussed further below, the Solid State Blade's extremely low storage latency, large bandwidth, and close coupling to processing resources have significant benefits in a variety of applications.

In addition to providing an interconnect between the CPU 104 and the array of low power computing complexes 10, the FPGA router 106 provides off-blade communication. In a number of embodiments, the FPGA router 106 provides interconnects to one or more ports 110 to a high performance network fabric. In a number of embodiments, 4 GB/s×8 PCI Express interconnects are used to connect the FPGA router 106 to a pair of InfiniBand ports. In other embodiments, any appropriate interconnect and high-performance network fabric can be utilized as is appropriate to a specific application.

FPGA Router

There are several FPGAs that can be utilized to construct a FPGA router in accordance with embodiments of the invention. For example, the 7 series FPGAs manufactured by Xilinx, Inc. of San Jose, Calif. provides 2.4 Tbp/s of I/O bandwidth, 2 million logic cells, and $4.7 \times 10^{12}$ multiply-accumulators per second (DSP), while consuming 50% less power than previous generation devices. Two Virtex-7 parts (XC7V690T or XC7V415T) can be utilized to implement a FPGA router designed to interconnect 64 complexes with a CPU and a pair of InfiniBand ports. In other embodiments, any of a variety of FPGAs appropriate to the application can be utilized.

When the FPGA router is implemented using an FPGA similar to the 7 series FPGAs described above, the FPGA includes additional logic capacity that can be utilized for performing high-level functions such as communication protocol implementation and on-the-fly data transformations. The Message Passing Interface (MPI) defined by the MPI Forum can be utilized for some or all of the FPGA router's communication protocols and implemented in the FPGA. The FPGA can also be utilized to implement other functionality including but not limited to on-the-fly complex communication patterns, data filtering, and coding. The large logic cell capacity of modern FPGAs allows for many options and these could conceivably be reprogrammed dynamically for different application requirements. In many embodiments, the FPGA can be used to implement a software RAID across all of the non-volatile memory components upon the Solid State Blade.

Solid State Blade Performance and Power Consumption

The performance of a Solid State Blade implemented using an array of 64 C1 complexes, each with 96 GB of effective non-volatile memory storage, and interconnected using 500 MB/s ×1 PCI Express interconnects via an FPGA router implemented on an 7 series FPGA in the manner outlined above would achieve approximately 2.6 TFlops in the accelerators with 6.1TB of non-volatile memory storage. This performance estimate ignores the 64 C1 core(s) and the cores of the CPU, which likely would be busy orchestrating the computations in the accelerators. As noted above, the typical non-volatile memory latency is approximately two orders of magnitude less than a traditional disc. Furthermore, the Solid State Blade could read and process its entire contents in less than ten minutes; 2 TB sever-based disks would take approximately two orders of magnitude longer. A collection of Solid State Blades also checkpoints in about 10 s. Effectively, the collective capacity of the many low power computing complexes breaks through the bottleneck imposed on other systems by the need to access data on server based disk drives.

A conventional blade is typically limited to a power consumption of approximately 600 W. In the context of a Solid State Blade, the 600 W is divided between the CPU and its DRAM, the array of C1 complexes and associated non-volatile memory, the FPGA router and the associated InfiniBand ports. The allocation of power on the low power computing complex SoC is crucial as this is where most of the blade power is consumed. The trade off is between the amount of power that is consumed by the processing core, the cache, and the accelerator. This will depend on the selection (e.g. Atom or ARM) of the core(s), cache size, and accelerator selection (e.g. ClearSpeed or some other GPU). Calculations suggest that C1 complexes can be constructed having a power budget of 7 W each, divided as: 1.5 W to the processing core+cache +DRAM, 1.5 W to the non-volatile memory, and 4W to the accelerator (the ClearSpeed CSX700 achieves 40 GFlops at 4 W and 96 GFlops (double precision) at about 9W). An Intel Westmere EP with six cores at 2 GHz with 64 GB of associated DRM consumes about 120W, which leaves about 30 W for the FPGA router. Additional power tradeoffs can occur in the FPGA router between whether power within the FPGA should be utilized to increase raw performance (i.e. latency and bandwidth) or to handle high-level protocols like message passing or application specific communication operations.

Based upon the above estimates, a server of 14 Solid State Blades would run at 56 Tflops and have 84 TB of useable non-volatile memory. Using commercially available InfiniBand switch fabrics, 300 or more of these servers could be connected, drawing 3 MW, and the resulting machine would be one of the fastest computers in the world with unprecedented, and game changing, data processing capabilities. These performance numbers are based upon technology currently available in 2011. By 2014, a large machine constructed from Solid State Blades should be able to achieve 80 PFlops at 5 MW, which is comparable to what is expected for more traditional architectures. However, the Solid State Blade system would be able to store tens of PB of data right in the non-volatile memory on the Solid State Blades with latency and bandwidth two orders of magnitude better than server based disc storage solutions. Additional iterations of Moore's law would increase the performance of the system to about 400 PFlops at 10 MW and hundreds of PB of very fast storage by 2017, a machine verging on exascale class.

Flash Memory and Write-Wear

The high density, low power, and read/write performance of NAND Flash memory makes them ideal for use on Solid State Blades in accordance with embodiments of the invention. Flash memories are non-volatile but can only be written some (large number) of times before they wear out. They are typically programmed and erased by high-field Fowler-Nordheim tunneling injection of electrons in a very thin dielectric film to charge and discharge a gate. The current through the dielectric degrades the quality of the oxide and eventually leads to breakdown. However, if the non-volatility constraint is relaxed, more writes can be done before parts wear-out. Single-level cell (SLC) parts should be used since they have better tolerance to write wear. It's expected that SLC parts can handle about 1 million writes per part with retention times of about a week. In a number of embodiments, write-wear is combatted using a variety of techniques including but not limited to decreased retention time, use of RAID arrays, and software techniques.

Programming Solid State Blades

A Solid State Blade in accordance with an embodiment of the invention can be programmed with existing abstractions since at the CPU level it looks like an accelerator and a very fast disc storage. In a number of embodiments, abstractions that can be utilized include Open CL and triplestores. OpenCL (Open Computing Language) is a framework for writing programs that execute across heterogenous platforms consisting of CPUs, GPUs, and other processors. Open CL includes a language for writing kernels, plus APIs that are used to define and then control the platforms. A triplestore is a purpose-built database for the storage and retrieval of Resource Description Framework metadata. Much like a relational database, information is retrieved from a triplestore via a query language. Unlike a relational database, a triplestore is optimized for the storage and retrieval of many short statements called triples, in the form of subject-predicate-object. In other embodiments, any of a variety of abstractions appropriate to a specific application can be utilized.

Accelerators and GPUs typically provide significant processing power for certain streaming arithmetic operations. The rising popularity of performing general-purpose computation on these devices has led to a proliferation of language systems designed to abstract away the details of these highly array-parallel processors while conveniently presenting the aspects of the specialized dataflow that effectively utilize the accelerators. An emerging standard for programming accelerators is OpenCL. The multiplicity of C1 complexes bound together by the on-board router on a Solid State Blade can be made to appear like a single accelerator to a CPU programmed in OpenCL. Of course, the low power computing complexes are far more general computing devices than the comparatively primitive cores of current accelerators, and this additional computational power can be harnessed by adapting OpenCL or developing similar software to support additional Solid State Blade capabilities.

The Resource Description Framework (RDF) is a data representation and associated query language (SPARQL) for storing and processing structured information that is being used in a number of applications in knowledge representation, e-science, and intelligence. In RDF information is represented in the form of (subject, property, value) triples. The term "triple store" can be used to mean a database of triples that is configured to be queried using a query language such as, but not limited to, SPARQL. Queries of triple stores can be viewed as graph matching problems. Storing literals in a B+-tree that maps literals to ids can improve the performance of queries in systems that utilize page-mode access memories like Flash memories. Assuming 4096 Byte pages, a single low power computing complex can have 24 million data pages. A compressed index to these pages fits into a few hundred MB and so a complex can use its DRAM to easily index into the page level of its non-volatile memory. A literal tree with 100 Billion literals could be stored in a single Solid State Blade. Each low power computing complex would get a fraction of the tree and lookup requests would be broadcast via the FPGA router. A lookup only takes one data page read from the non-volatile memory (typically around 50 µs) and the index work in the DRAM is comparatively instantaneous. Therefore, the entire Solid State Blade can handle over a million string lookups per second on a tree occupying a few terabytes. The reverse mapping of id to literal can be handled similarly.

When a triple store is used in a Solid State Blade computing system in accordance with embodiments of the invention, care can be taken to avoid excessive write pressure on the non-volatile memory. Simply inserting elements into a tree can cause many page writes as the data pages are populated. Instead, the raw text of the database can be read into the non-volatile memory array first, where it can be accessed as necessary to build the DRAM based index. In this way, the data pages can be populated with one write and the raw text discarded. Normal insert/delete/modify operations are still possible. The above process simply avoids the wear to the non-volatile memory that would be associated with using these operations to build the initial triple store.

Applications for Solid State Blade Computing Systems

Many data-intensive applications can be accelerated by Solid State Blade computing systems. In many embodiments, Solid State Blade computing systems are utilized to perform scientific data analysis. There is a flood of scientific data from modern instruments. For example, the Large Synoptic Survey Telescope (LSST) will image the sky nightly to produce a detailed map of the universe and to look for transient events such as asteroids and supernovae. LSST will produce on the order of a TB a night of data. Comparisons of such large data sets represent a significant challenge for conventional computing systems. A single rack of 84 Solid State Blades can store over a year's worth of data and continually analyze the data for interesting astronomical phenomena. Similarly, the detectors at the Large Hadron Collider at CERN produce on the order of a TB of data a day. The detectors are calibrated (trained what to look for) by running Monte-Carlo simulations of the Standard Model and alternatives. Solid State Blades would be ideal for both storing the data and doing the simulations.

In a number of embodiments, Solid State Blade computing systems are used in video processing applications. Movies of DVD quality can occupy as much as 4 GB and a single server could store a library of about 2,000 movies. Each frame can involve as much as several MB of data, and at 60 frames/s a single Solid State Blade could apply about 30 Gflop of processing power to each frame in real-time. Therefore, a number of potential applications exist in live broadcasting, video services, and defense.

In certain embodiments, Solid State Blade computing systems are utilized to provide search engine functionality. Assuming that the average web page is about 100 KB, 1 billion web pages would have a total size of 100 TB and with the aid of a small amount of compression could fit onto a single server of 14 Solid State Blades. An index could then be created of a million words and popular proper nouns (e.g. people or places) that lists the pages that contain a given word or name ranked by page popularity. This index can be distributed to each low power computing complexes and stored in the DRAM of each complex. When a search query is provided, the matching pages can be found almost instantly and in parallel. The most time consuming step likely would be fetching the page summaries from the non-volatile memories. Fetches are only needed for the top 20 matches (as determined by the index). If the pages are randomly distributed across the non-volatile memory, this typically takes around 50 µs. The limit to the server performance of such a system is the non-volatile memory latency itself. Estimates show that a single server can handle several hundred thousand queries a second, a rate higher than the estimated load on the Google search engine provided by Google, Inc. of Mountain View, Calif.

In several embodiments, Solid State Blade computing systems are used for storing and processing interaction graphs between people and other entities, such as businesses and governments. This has some similarities with web search, and triple stores are a natural way to represent such data.

Although specific applications are outlined above, Solid State Blade computing systems in accordance with embodiments of the invention can be utilized in any of a variety of applications including but not limited to other scientific data analysis applications, business analytics applications, and tomography applications.

What is claimed:

1. A blade server, comprising:
a plurality of computing complexes;
an on-server router;
a processor configured to communicate with the plurality of computing complexes, wherein the processor is interconnected to the plurality of computing complexes by the on-server router;
wherein each computing complex comprises:
a System on Chip that includes at least one general processing core, an associated cache memory, an I/O interface, and a memory controller, and wherein the system on chip is packaged in a stacked 3D structure with a memory; and
a non-volatile memory component configured in a RAID configuration that is separate from and connected to the system on chip;
wherein a general processing core in a given computing complex is configured to use the memory controller to directly read and write data to the non-volatile memory component within the given computing complex;
wherein general processing cores in the plurality of computing complexes are configured to directly read from and write data to the non-volatile memory component to which they are connected in parallel;
wherein the on-server router is configured to (1) connect the plurality of computing complexes using individual interconnects and (2) provide at least one interconnect to at least one port of a network fabric; and
wherein the blade server is configured to communicate with a plurality of blade servers via the network fabric;
wherein the processor is configured to generate an index and distribute a fraction of the index to each of the plurality of computing complexes for storage within the memory of each computing complex;
wherein the processor is configured to broadcast, via the router, lookup requests with respect to data stored within the plurality of computing complexes to the general processing cores within the plurality of computing complexes via the interconnects with the router; and
wherein the general processing cores are configured to search for data requested by the lookup requests in parallel using the fraction of the distributed index stored in the package on package memory of each of the plurality of computing complexes.

2. A parallel computing system, comprising:
at least one Solid State Blade configured to communicate via a network fabric;
wherein each Solid State Blade comprises a plurality of computing complexes, an on-server router, and a processor configured to communicate with the plurality of computing complexes, wherein the processor is interconnected to the plurality of computing complexes by the on-server router;
wherein each computing complex comprises:
a System on Chip that includes at least one general processing core, an associated cache memory, an I/O interface, and a memory controller; and
wherein the system on chip is packaged in a stacked 3D structure with a memory;
wherein each computing complex is configured to communicate with an associated non-volatile memory component that is separate from and connected to the system on chip;
wherein a general processing core in a given computing complex is configured to use the memory controller to directly read and write data to the non-volatile memory component within the given computing complex and the general processing cores in the plurality of computing complexes are configured to directly read and write data to the non-volatile memory component to which they are connected in parallel;
wherein the on-server router is configured to (1) connect the plurality of computing complexes using individual interconnects and (2) provide at least one interconnect to at least one port of a network fabric;
wherein the at least one Solid State Blade is configured to communicate with a plurality of Solid State Blades via the network fabric;
wherein the processor is configured to generate an index and distribute a fraction of the index to each of the plurality of computing complexes for storage within the package on package memory of each computing complex;
wherein the processor is configured to broadcast, via the router, lookup requests with respect to data stored within the plurality of computing complexes to the general processing cores within the plurality of computing complexes via the interconnects with the router; and
wherein the general processing cores are configured to search for data requested by the lookup requests in parallel using the fraction of the distributed index stored in the memory of each of the plurality of computing complexes.

3. The parallel computing complex of claim 2, wherein the non-volatile memory component is NAND Flash memory.

4. The parallel computing complex of claim 2, wherein the computing complex is configured to communicate with the non-volatile memory at a rate of at least 200 MB/s.

5. The parallel computing complex of claim 2, wherein each computing complex is a System on Chip with Package on Package DRAM memory.

6. The parallel computing system of claim 2, wherein at least one non-volatile memory component is configured in a RAID configuration.

7. The parallel computing system of claim 2, wherein the plurality of computing complexes are directly connected.

8. The parallel computing system of claim 2, further comprising a plurality of Solid State Blades interconnected via the network fabric.

9. The parallel computing system of claim 2, wherein each of the at least one non-volatile memory components dedicated to a computing complex is packaged by Package on Package to the computing complex.

10. The parallel computing system of claim 2, wherein a first computing complex is configured to access data within a non-volatile memory component that is dedicated to a second computing complex by requesting the data from the second computing complex via the router.

11. The parallel computing complex of claim 2, where a software RAID configuration is implemented across all of the non-volatile memory components of each of the plurality of computing complexes.

12. The parallel computing complex of claim 2, wherein each interconnect is configured to provide data rates of at least 500 MB/s.

13. The parallel computing complex of claim 2, wherein the interconnect between the router and the processor is configured to provide data rates of at least 25 GB/s.

14. The parallel computing complex of claim 2, comprising at least 32 computing complexes.

15. The parallel computing complex of claim 2, wherein the I/O interface is configured to communicate at a rate of at least 500 MB/s.

16. The parallel computing complex of claim 2, wherein each computing complex directly reads and writes data to a non-volatile memory component configured as a RAID array.

17. The parallel computing complex of claim 16, wherein the RAID array is implemented using the memory controller incorporated in each computing complex, and wherein the memory controller is a RAID controller.

18. The parallel computing complex of claim 2, wherein the I/O between the computing complex and other devices is managed by the I/O interface.

19. The parallel computing complex of claim 2, wherein the router is a programmable router.

20. The parallel computing complex of claim 2, wherein the at least one Solid State Blade is programmable using an Open Computing Language (Open CL) and triplestores.

* * * * *